UNITED STATES PATENT OFFICE.

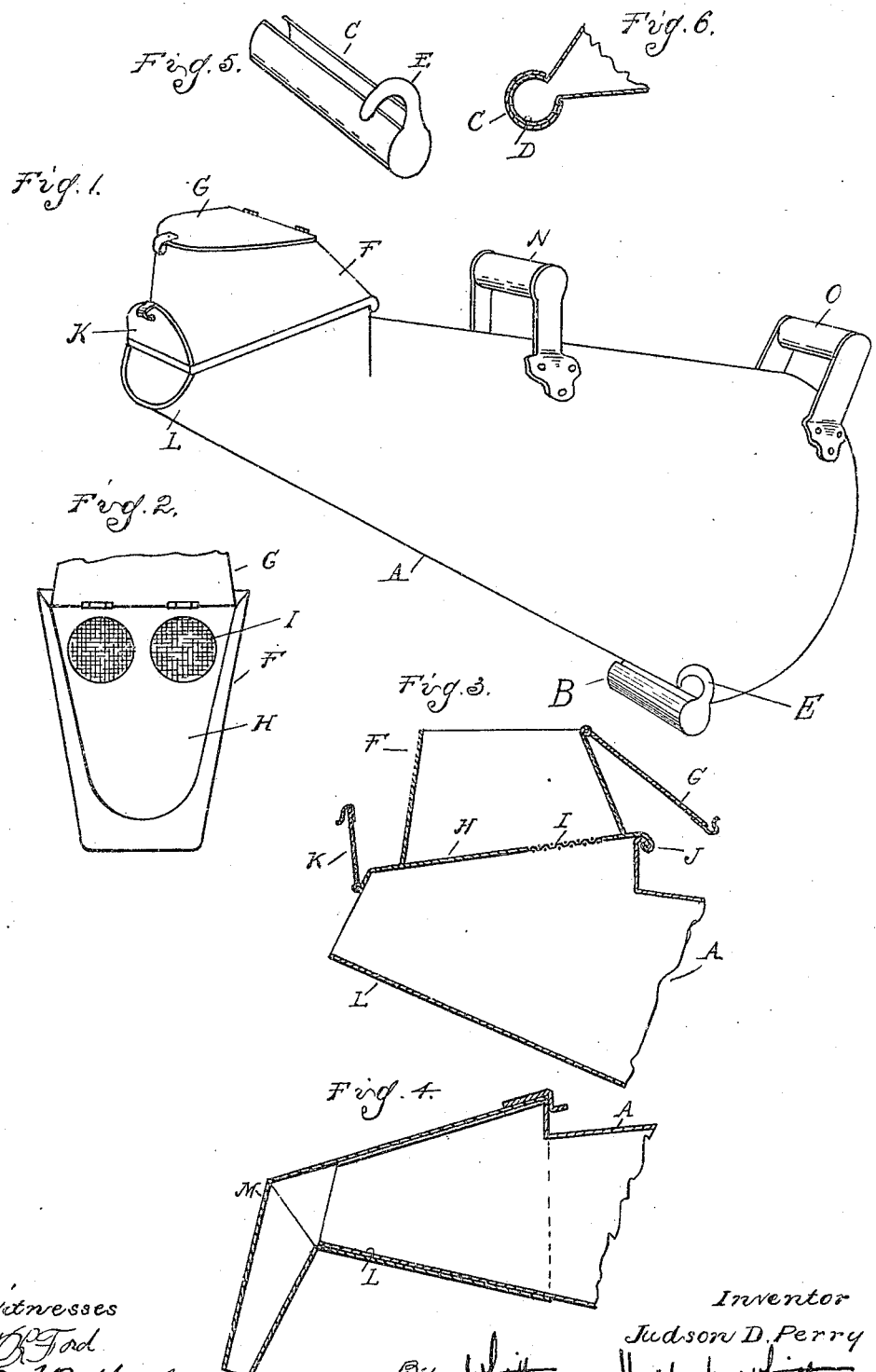

JUDSON D. PERRY, OF MONTGOMERY, ALABAMA.

MILK-PAIL.

959,590.

Specification of Letters Patent.   Patented May 31, 1910.

Application filed January 30, 1909.  Serial No. 475,101.

*To all whom it may concern:*

Be it known that I, JUDSON D. PERRY, a citizen of the United States of America, residing at Montgomery, in the county of Montgomery and State of Alabama, have invented certain new and useful Improvements in Milk-Pails, of which the following is a specification, reference being had therein to the accompanying drawings.

The invention relates to milk pails of that type in which the pail is used by the operator as a seat, and the invention consists in certain features of construction, as hereinafter set forth.

In the drawings—Figure 1 is a perspective view of the pail; Fig. 2 is a plan view of the milk-receiving receptacle and strainer; Fig. 3 is a longitudinal section through this receptacle in the upper portion of the pail; Fig. 4 is a similar view of the pail provided with a filler nozzle; Fig. 5 is a perspective view of the detachable shoe for supporting the pail; and Fig. 6 is a section thereof and in engagement with the pail.

A is the body of the pail, which is preferably of a tapering form, and which at the enlarged end is provided with a rocker bearing B for resting upon the ground or floor. The small end of the body is provided with an opening through which the milk is introduced and in use the operator seats himself upon the enlarged end of the pail, and maintains a balance by tilting it in one direction or another during the accumulation of the milk therein.

One of the features of my invention is the construction of this rocker support. It frequently happens that the ground or floor upon which the pail is supported is covered with litter which necessitates a cleansing of the pail after the milking operation. I have therefore provided a detachable shoe for the rocker support, which may be quickly detached from the pail, and more readily cleansed than where integral therewith. This, as shown, consists of a tubular member C which telescopically engages a rib D upon the lower portion of the pail body, while a handle E forms a means of engaging or disengaging the shoe.

Another feature of my invention relates to the form of receptacle in which the milk is introduced. With the common construction of pails, a large opening is provided, which is an unsanitary arrangement, as it permits dirt and dust to enter with the milk to contaminate the same. I have discovered that a relatively narrow opening is just as convenient for the milker, and that by thus restricting the open area the dirt is largely expelled. Various forms may be used but, as shown, the receptacle F is of a tapering form, and is preferably detachable from the body portion A of the pail. It is also preferably provided with a hinged lid G, which may be turned back when in use, but, as soon as the milking operation is over, may be closed to exclude the dust. The receptacle F is also preferably provided with a bottom portion H at one end of which is arranged a strainer I through which the milk can pass into the pail, but the imperforate portion of the bottom will retain a sufficient quantity of the milk to make a froth, this being always desired by the milker. As shown, the receptacle F is secured to the body of the pail by a hooked engagement J at one end, while at the opposite end it is provided with a hinged lid K for closing a nose portion L of the pail through which the milk may be emptied.

Where it is desired to fill bottles directly from the pail, a filler nozzle M may be provided, and which may either be made a part of the receptacle F, Fig. 3, or it may be a separate member, which is engaged with the bottom of the pail after the removal of the member F, this being illustrated in Fig. 4.

It will be noted that all of the walls of the receptacle F are tapering and that consequently when the milk is directed into the receptacle it cannot splash out. The upper portion of the body A is preferably provided with a handle N, which serves both to hold the pail while in a horizontal position, and to carry it in a substantially upright position after the completion of the milking. In addition to the handle N, a second handle O is preferably provided at the base of the pail, and this serves the double function of a handle for use in pouring the milk from the pail and a rest or back for the seat when the pail is in milking position.

What I claim as my invention is:

1. A milk pail comprising a tapering body portion, a detachable milk-receiving receptacle at the small end thereof, said receptacle having a contracted orifice, a hinged lid for closing said orifice, and a second hinged lid for closing a discharge orifice in the tapering end of the pail.

2. A milk pail provided with a rockable support, and a detachable shoe engaging said support.

3. A milk pail comprising a tapering body, a transversely-extending rocker support at the large end of said body, and a detachable shoe for engaging said support.

4. A milk pail comprising a tapering body, a transversely-extending rocker support at the large end of said body, and a handle diametrically opposed to said rocker support and forming a seat back.

5. A milk pail comprising a tapering body, a transversely-extending rocker support at the large end of said body, a handle diametrically opposite said rocker support and a second handle in the intermediate portion of the body.

6. A milk pail provided with a detachable milk-receiving receptacle transverse to the longitudinal axis of the pail, said detachable receptacle having a contracted orifice at the top, and an enlarged lower portion.

7. A milk pail, comprising a tapering body portion, having a discharge orifice in the tapering end of the pail, and a second orifice in the side of the pail adjacent the tapering end, and a milk-receiving receptacle positioned over the orifice and detachably engaging the pail.

8. A milk pail, comprising a tapering body terminating in an enlargement at its tapered end and a member having a detachable interlocking engagement with the contracted end of the body and terminating in a transversely projecting nozzle.

9. A milk pail, comprising a tapering body and a filler nozzle projecting outwardly from the body and having a detachable interlocking engagement therewith.

10. A milk pail comprising a tapering body having an enlarged portion at its tapered end provided with a shoulder, and a detachable receptacle having an interlocking engagement with said shoulder.

11. A milk pail comprising a tapering body terminating in an enlarged portion at its tapered end, provided with an orifice in the side thereof and having a shoulder projecting transversely from the body portion, and a detachable receptacle having a contracted orifice at the top and an enlarged lower portion, said lower portion being adapted to engage said shoulder and having an interlocking engagement therewith.

In testimony whereof I affix my signature in presence of two witnesses.

JUDSON D. PERRY.

Witnesses:
J. T. MOSES,
M. R. CRABILL.